Figure 1:
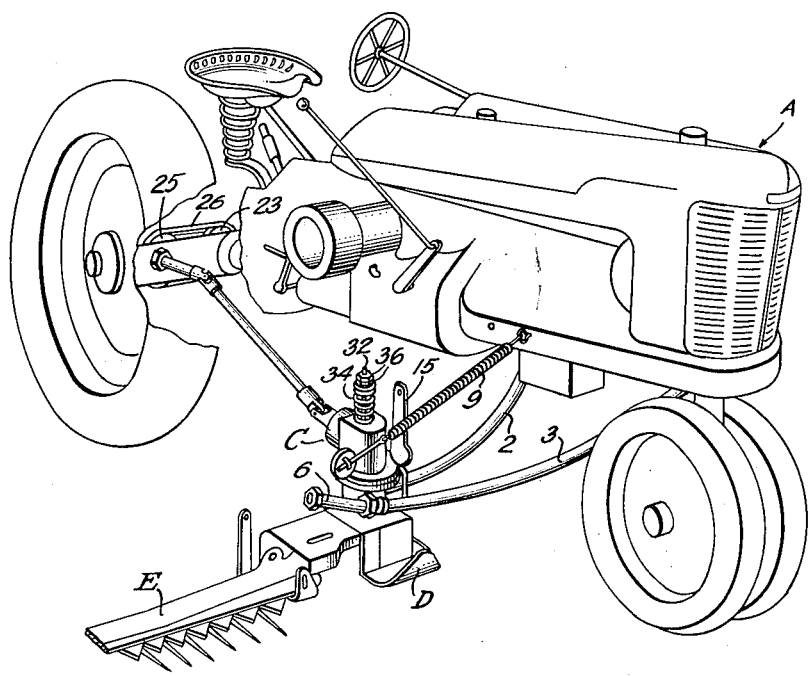

Oct. 2, 1956  J. R. WEST  2,764,899
PIVOTAL BEVEL GEARING

Filed Jan. 2, 1952  3 Sheets-Sheet 1

INVENTOR
James R. West
BY Richard E. Babcock Jr.
ATTORNEY

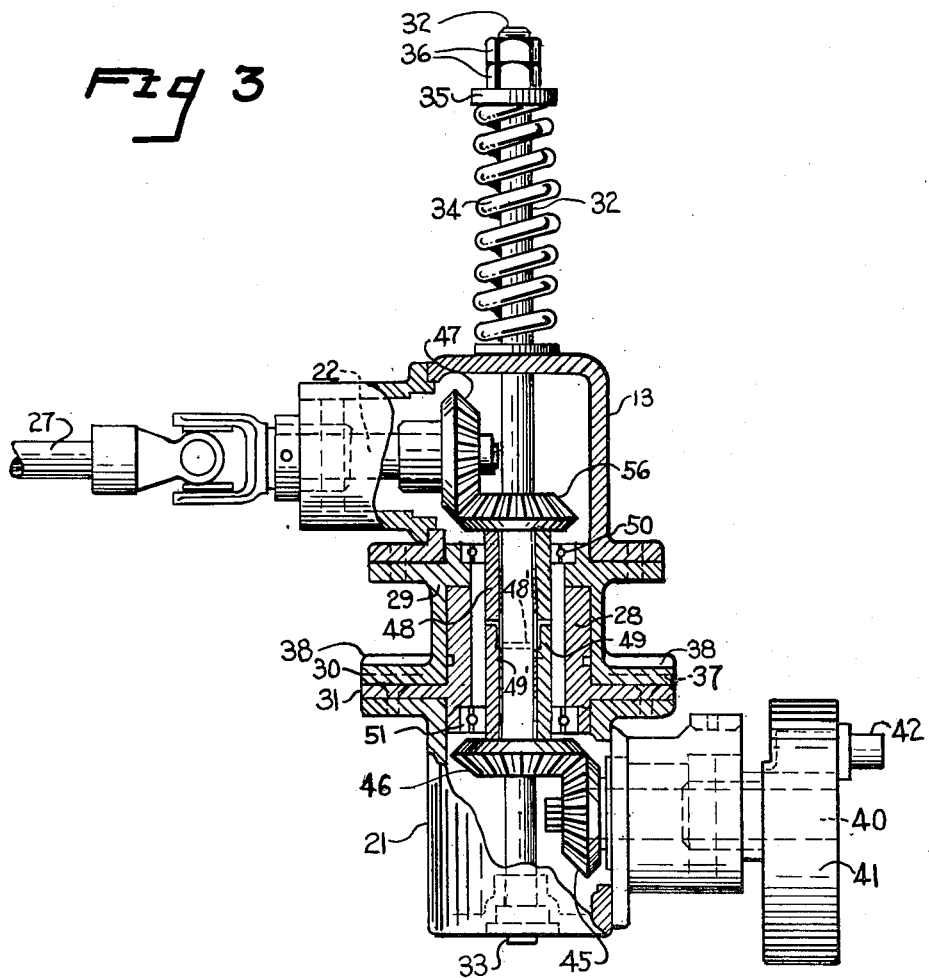

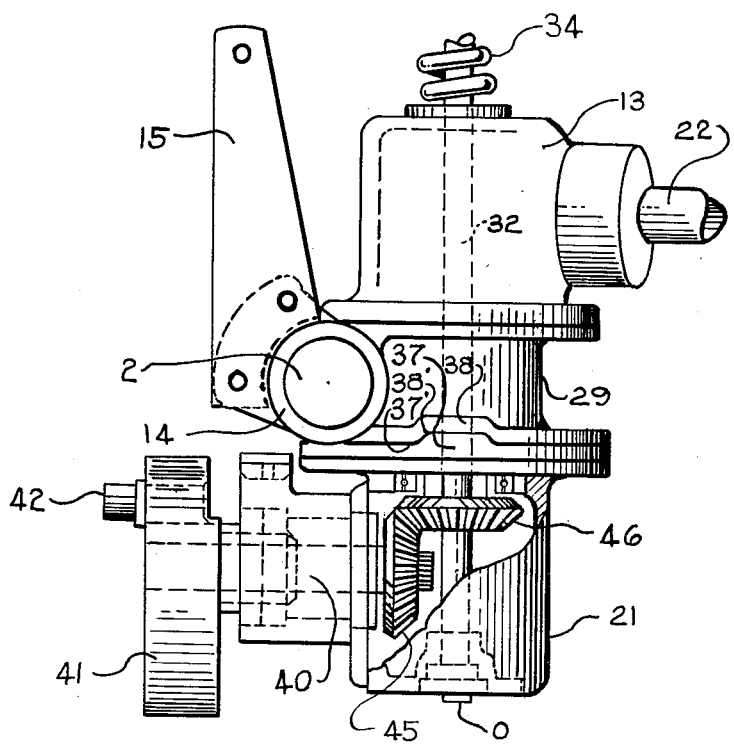

United States Patent Office 2,764,899
Patented Oct. 2, 1956

2,764,899
PIVOTAL BEVEL GEARING

James R. West, New Holland, Pa., assignor, by mesne assignments, to Sperry Rand Corporation, a corporation of Delaware Application January 2, 1952, Serial No. 264,603

11 Claims. (Cl. 74—385)

This invention relates to a mower drive mechanism of the so-called break-away type, in which the cutter bar normally extends transversely to the path of travel of a tractor or other transporting vehicle, but is permitted to swing rearwardly responsive to a predetermined amount of opposition to its forward operative movement, such as may be caused by unusually heavy masses of vegetation and the like, which might otherwise cause damage to the various mower parts.

Such break-away mower drive mechanisms have been customarily employed in the past. In drive mechanisms of this type, the rearward swinging or yielding movement of the cutter bar has generally served to disconnect the drive or driving means which imparts reciprocating movement to the cutter knife or knife bar. Thus, when the cutter bar is returned forwardly to its operative position it is necessary that some suitable arrangement be provided for reestablishing this driving connection.

With the foregoing in mind, it is a primary object of my invention to provide breakaway mower drive mechanism in which the driving connection to the reciprocating cutter knife remains operative despite rearward swinging or yielding of the cutter bar, or in other words is operable in all positions of the cutter bar, thus, overcoming the problem of re-establishing such drive connection upon the return of the cutter bar to operative position.

It is a further object of the invention to provide a drive mechanism which will remain operable while permitting adjustment of the cutter bar about its major axis as may be required in order to adjust the "angle of attack" of the cutter bar relative to the ground, to meet varying conditions.

In order to attain these objects, I form the housing for the drive mechanism in two sections, which are relatively rotatable about a fixed axis and also relatively movable along said axis. Resilient means normally urges these two housing sections toward each other so that clutch means carried by both may interengage and normally maintain the housings in relatively fixed rotational positions. Rotary driving elements within the respective housing sections are connected by an extensible means which remains operative throughout the range of axial movement between the respective housing sections, the rotary drive means in the one section being operatively connected to the cutter knife to cause reciprocation of same, and the drive means in the other said section being connected to any suitable source of power. Cooperating elements on the two housing sections, such as the clutch means themselves, are formed with cooperating cam surfaces which may function to separate the said housing sections against the resistance of the resilient means, thus disengaging the clutches and permitting the cutter bar and its supporting section to swing rearwardly when excessive resistance to its forward movement is encountered, the extensible connection between the drive means nevertheless serving to maintain the mower drive in operation despite such axial separation of the housing sections.

Figure 2:
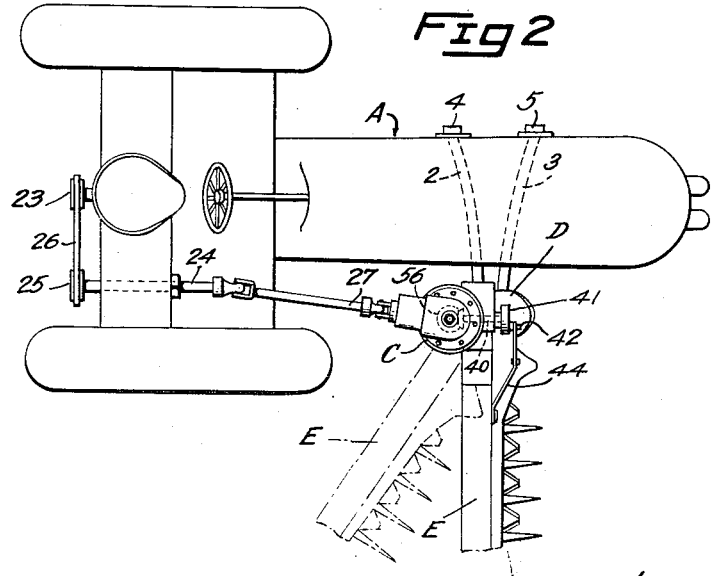

Further objects and advantages will be apparent from the following detailed description, in conjunction with the accompanying drawings, in which:

Figure 1 represents a perspective view of a usual farm tractor equipped with a mower embodying my invention, portions of the tractor and mower being broken away;

Figure 2, a reduced plan view of the tractor and mower shown in Figure 1, showing the cutter bar in broken lines in its rearwardly swung or broken away position;

Figure 3, an enlarged front elevation, partly in section, showing the mower drive mechanism of the invention with the ground shoe removed; and, Figure 4, a rear elevation of the mower drive mechanism, a part of the lower housing section being broken away to permit a view of its contents, and the ground shoe being removed, as in Figure 3.

For purposes of illustration I have shown the invention as it may appear when mounted on a usual farm tractor and driven from the power-take-off of the tractor. However, it will be understood that the invention is by no means limited to use on a tractor, but may be supported on any suitable type of carriage of trailer, and driven from any suitable source of power.

Referring now in detail to the accompanying drawings, the tractor, generally designated A, may be of any usual type, preferably being equipped with a power-take-off, as in Figures 1 and 2 of the drawings.

The mower is supported on this tractor by means of supporting arms 2 and 3 respectively which in the present instance may be formed of suitable round metal stock. These extend completely beneath the tractor and have their ends pivotally connected to the far side of the tractor frame, as at 4 and 5 respectively, to permit vertical swinging movement or adjustment of the free ends of the arms. The free ends of the arms are preferably rigidly connected together as by means of a sleeve 6 disposed over the free end of arm 3 and secured to the free end of arm 2. The arrangement is such that the free end portion of the arm 2 projects substantially transversely and to one side of the path of movement of the tractor and is braced against rearward deflection by the arm 3 which functions as a diagonal brace. The mower drive mechanism supported at the free end of the arm 2 is housed within a casing, generally designated C, a spring 9 connected under tension between the casing C and the tractor frame cooperating with the arms 2 and 3 to provide a floating support enabling the casing C to ride over any uneven spots in the surface of the ground. In order to facilitate such riding action, the casing C may be provided with a usual ground shoe D as shown in Figures 1 and 2.

Connected to the bottom portion of the casing C and extending laterally outwardly from the side of the tractor is a usual cutter bar E including a usual reciprocating cutter knife 11. Preferably the connection between casing C and the cutter bar E is a hinged one, as at 12 to permit raising of the cutter bar to inoperative position for travel to and from the field, all in accordance with usual practice.

Referring now to Figures 3 and 4, it will be seen that the casing C comprises an upper section 13 which is provided externally with a sleeve 14 rotatably receiving the free end portion of the supporting arm 2, and thus, cooperating with the arm 2 to provide a means whereby the drive mechanism and the cutter bar E may be adjusted about an axis parallel to the major axis of the cutter bar E to vary the angle of attack of the cutter bar with relation to the ground surface in order to meet varying conditions of operation. In order to maintain the cutter bar and drive mechanism in various desired positions of adjustment about the free end of arm 2, a lever 15 fixed to the top casing section 13 may be provided.

The drive casing or housing C comprises both the upper housing section 13 and a lower housing section 21 which is disposed for rotary movement about a fixed vertical axis relative to the upper section 13. The upper section 13 is connected to and supported by the arm 2 by means of the sleeve structure aforementioned and has a power transmitting shaft 22 journaled through the side thereof, whereby driving power from any suitable source may be transmitted through the mower drive mechanism within the casing C. In the instant embodiment of my invention driving power is transmitted to the shaft 22 from the rear power-take-off pulley 23 of the tractor by means of a countershaft 24 suitably supported beneath the rear axle of the tractor and having a pulley 25 thereon which is driven from the pulley 23 by means of a usual V-belt 26. A shaft 27 extending between and universally connected to both the countershaft 24 and shaft 27 by universal joints as shown completes the drive means between the power-take-off pulley and the shaft 22. The universally connected power transmitting shaft 27 will of course permit raising and lowering of the drive housing or casing C during operation of the mower without any interruption of the drive.

The lower housing section 21 supports the cutter bar in such manner that when the cutter bar encounters an obstruction or meets an excessive amount of resistance to its forward movement the cutter bar and lower housing section 21 may both swing rearwardly, as indicated in broken lines in Figure 2.

In the present embodiment of the invention, the rotary and axially extensible connection between the two housing sections 13 and 21 is defined by cylindrical telescopically disposed portions 28 and 29 respectively each being rigidly connected to its particular housing section.

The two housing sections 13 and 21 are resiliently urged toward each other so that cooperating interlocking or clutch means 30 and 31 respectively carried by the members 13 and 21 may normally engage and interlock with each other to normally maintain the lower housing section 21 against rotation in the operative position indicated in Figure 1.

A suitable means for thus urging the two sections 13 and 21 into resilient engagement may comprise a central shaft 32 extending through both housing sections 13 and 21 coaxially with their respective cylindrical telescopically connected portions 28 and 29. The lower end of this shaft is welded or otherwise fixedly connected to the lower housing section 21, as at 33, and the upper end of the shaft is slidably disposed through an opening in the housing section 13 to project upwardly thereabove. A spring 34 is disposed under compression between the top of housing section 13 and a washer 35 fixedly positioned on the shaft as by means of jam nuts 36 threaded on the upper end of said shaft 32. It will be seen that as thus arranged, the spring 34 will tend to resiliently raise the shaft 32 and the housing section 21 carried thereby, to maintain the latter in engagement with the upper housing section 13. The compression of the spring 34 may be adjusted as desired by tightening or loosening the nuts 36. The clutch means 30 and 31 are so arranged that they will interlock and maintain the housing sections against relative rotary movement only in the operative position of the lower housing section 21 and cutter bar, E as shown in full lines in Figure 2, but once the cutter bar and lower housing section 21 have been displaced from this particular rotational position will offer only frictional resistance to continue rotational movement or displacement thereof. To this end the clutch members or interlocking members 30 and 31 comprise flanges carried by the respective telescoping cylindrical housing sections or portions 29 and 28 respectively. These flanges are provided with opposed flat surfaces normally directed toward and engaging each other. One of the flanges or clutch portions 31 is provided with raised ribs or projections 37 which are normally received in conformingly shaped indentations or recesses 38 in the clutch member 30. As best shown in Figure 4, the interlocking means or elements 37 and 38 are formed with cammed or sloping surfaces 37' and 38' respectively in rotary abutment, their degrees of slope being such that they will cooperate to prevent rotary displacement of the mower housing section under normal operating conditions of the cutter bar, but will cooperate to axially separate the two housing sections 13—21, when urged together with a predetermined force, thus removing the interlocking ribs 37 from their respective recesses 38 so that the ribs 37 may thereafter ride over the smooth face of the flange 30 and permit rearward rotary displacement of both the cutter bar and the lower housing section 21.

The holding power of the interlocking elements 37 and 38 is dependent upon the degree of the slope of the cam surfaces 37' and 38' the axial overlap of said interlocking elements 37 and 38, and of course the compressive force exerted by the spring 34. Preferably the compression of the spring, 34 as determined by adjustment of the jam nuts 36, is such that the cutter bar E will be permitted to swing rearwardly either when it encounters an obstacle or when the resistance to its forward movement through the crop material becomes sufficient to threaten damage to the cutter bar or its drive mechanism.

As may be best seen in Figure 4, the crank shaft 40 of the cutter bar is rotatably journaled in the lower housing 21 at right angles to the rotational axis of the housing 21. A usual counterbalanced crank disc 41 fixed on the external end of this shaft 40 carries an eccentrically disposed crank pin 42 which, during the rotation of the shaft 40, causes reciprocation of the cutter knife 43 through a usual pitman or connecting rod 44, said connecting rod 44 being best shown in Figure 2.

Fixed on the inner end of the crank shaft 40 within the casing 21 is a beveled gear 45 which is in driven engagement with bevel gear 46 rotatably journaled in the housing sections 28 and 21.

In the preferred embodiment of the invention the gear 46 may assume the form of a beveled ring gear rotatably journaled about the vertical shaft 32.

A similar beveled ring gear 56 journaled about the shaft 32 in the upper housing section 20 is in driven engagement with beveled gear 47 keyed on the drive shaft 22.

Any suitable means may be employed for establishing an axially extensible driving connection between the gears or elements 46 and 45, it being essential only that the driving connection employed be extensible over an axial distance greater than the amount of axial movement required between the housing sections 13 and 21 to disengage the interlocking means or elements 37 and 38, whereby the driving connection between the gears 56 and 46 will remain operable at all times and thus will not have to be reestablished following each rearward swinging movement or yielding of the cutter bar C. The preferred form of such axially extensible connection comprises sleeves 48 and 49 respectively fixed to the gears 56 and 46 and preferably rotatably journaled in bearings 50 and 51 coaxially with the shaft 32. These sleeves 48 and 49 are formed with intermeshing axially directed teeth 48' and 49' which cause the toothed sleeves to rotate together while permitting relative axial movement therebetween for a distance equal to the axial overlap between the teeth. It will be noted that the axial overlap between these teeth 48' and 49' is somewhat greater than the axial overlap of the interlocking means 37' and 38', to thus maintain the driving connection between gears 56 and 46 when the interlocking means 37' and 38' are disengaged.

In the operation of the invention, when the tractor A is in motion with cutter bar E in operative position as illustrated in Figure 1, it will be seen that the pivoted arms 2 and 3, in conjunction with the spring 9, provide a floating mounting for the drive mechanism within the casing C and for the cutter bar E, so that as the shoe D rides along the ground and lightly contacts same, the entire cutter bar and its driving mechanism may easily rise and fall with the contour of the ground surface.

By suitable actuation of the adjusting lever 15, it will be seen that the entire housing C may be angularly adjusted about the supporting arm 2 to thus dispose the cutter bar E at the desired angle of attack about its major axis.

In the event the cutter bar E encounters an obstacle, or its forward movement is otherwise resisted with sufficient force to overcome the holding power of the clutch means 30 and 31, it will be seen that the cooperating cam surfaces 37', 38' of the interlocking elements of the clutch means will cause the raised elements 37 to ride out of the recesses 38 and across the smooth flat surface of the clutch member 30, as the lower housing section 21 rotates rearwardly with the rearwardly swinging or yielding cutter bar E. The axially extensible driving connection between the members or sleeves 48 and 49 will remain operable despite the axial separation of the housing sections 20 and 21 incident to disengagement of the clutch members. Thus, the cutter knife of the mower cutter bar will continue to reciprocate as the cutter bar E is swung rearwardly. The cutter bar E may be returned to operative condition in usual manner by simply reversing the movement of the tractor A to cause forward swinging movement of the cutter bar E, whereupon the interlocking elements of dogs 37 will automatically be seated within the recesses 38 as the cutter bar E reaches operative position and will thereafter hold it in such position until the holding power of the clutch means is again exceeded by forces resisting the forward movement of the cutter bar.

Thus, it will be seen that I have provided a simple and sturdy construction of breakaway mover drive in which the driving connection between the reciprocating mower blade and a suitable source of power is maintained operative at all times and thus eliminates the difficulty involved in having to re-establish the mower drive each time the mower blade yields rearwardly.

In this application, I have shown and described only the preferred embodiment of my invention simply by way of illustration of the practice of my invention as by law required. However, I recognize that my invention is capable of other and different embodiments, and that its several details may be modified in various ways, all without departing from my invention. Accordingly, the drawings and description herein are to be construed as merely illustrative in character and not as exclusive.

Having, thus, described my invention, I claim:

1. In a break-away mower drive mechanism, a pair of housings connected for relative rotary movement about a fixed axis and for relative linear movement along said axis, yieldable means normally urging said housings into axial engagement, axially directed normally interengaging cam means carried by the respective housings to prevent rotary movement between said housings, said cam means being arranged to axially separate said housings and ride over each other to permit relative rotary movement between said housings responsive to imposition thereon of a predetermined moment of force, in combination with rotary elements in the respective housings, and means coaxial with said elements establishing an axially extensible driving connection between said elements.

2. The combination defined in claim 1, wherein the means establishing said driving connection is axially extensible throughout a range of axial movement greater than that caused between said housings by the action of said cam means.

3. In a break-away type mower drive mechanism, a pair of housings openings toward each other disposed for rotary movement about a fixed axis extending through their respective openings, and for relative movement along said axis, clutch means carried by the respective housings and normally maintaining said housings in predetermined positions of relative rotation, resilient means urging said housings axially toward each other whereby said clutch means may be normally operatively engaged, cam means carried by said respective housings for axially separating said housings and disengaging said clutch means when the forces tending to cause relative rotary movement between said housings exceed a predetermined value, in combination with a drive member rotatable in one of said housings about said fixed axis, a driven member rotatable in the other of said housings about said axis, and means coaxial with said members establishing an axially extensible driving connection between said drive member and said driven member through said respective openings.

4. The combination defined in claim 3 in which the cam means are formed on and carried by said clutch means.

5. A mower drive mechanism comprising, a pair of housings respectively having cylindrical telescopically disposed portions defining a rotary and axially extensible connection between said housings, said cylindrical portions being respectively formed with outwardly projecting flanges, one of said flanges being formed with a locking recess, a locking projection carried by the other flange being normally received in said recess, means resiliently urging said housings toward each other to normally maintain said projection in said recess and thereby prevent relative rotary movement between said housings, said projection being formed with a cam surface enabling it to ride out of said recess and thus permit relative rotary movement between said housings when the forces tending to cause such movement exceed the holding power of said coacting projection and recess; in combination with a drive member rotatable in one of said housings about the axis of relative rotary movement of said housings, a driven member rotatable about said axis in the other of said housings, and means rotatable about said axis establishing an axially extensible driving connection between said members, through said first mentioned axially extensible connection.

6. A mower drive mechanism comprising, a pair of housings respectively having cylindrical telescopically disposed portions defining a rotary and axially extensible connection between said housings, one of said portions being formed with a locking recess, a locking projection on the other portion being positioned for reception in said recess, means resiliently urging said housings toward each other to normally maintain said projection in said recess and thereby prevent relative rotary movement between said housings, said projection being formed with a cam surface enabling it to ride out of said recess and thus permit relative rotary movement between said housings when the forces tending to cause such movement exceed the holding power of said coacting projection and recess; in combination with a drive member rotatable in one of said housings about the axis of relative rotary movement of said housings, a driven member rotatable about said axis in the other of said housings, and means rotatable about said axis establishing an axially extensible driving connection between said members.

7. A mower drive mechanism comprising a pair of hollow housings respectively having cylindrical telescopically disposed portions defining a rotary and axially extensible connection between said housings a shaft extending coaxially through said connection, said shaft being fixedly connected to one of said housings and slidable completely through the other of said housings, spring means on said shaft externally of said last mentioned housing urging the shaft axially in a direction to normally maintain said housings in engagement, interlocking elements carried by said respective housings normally in rotary abutment to prevent relative rotary movement between said housings, said elements being formed with cammed abutting surfaces capable of causing relative axial separation of said housings and disengagement of said interlocking elements when a force of predetermined magnitude tends to cause relative rotary movement between said housings, in combination with a driving ring gear rotatably journalled about said shaft in one of the housings, power means normally rotating said driving ring gear, a driven ring gear rotatably journalled about said shaft in the other said housing, and means coaxial with said shaft establishing an axially extensible drive connection between said gears.

8. A power mechanism comprising a supporting element adapted for mounting on an ambulatory support, a supported element connected to said supporting element for both linear and rotary movement relative thereto along a fixed axis, axially directed interlocking means carried by the respective elements and normally in locking engagement to retain the supported element against rotary movement, resilient means urging said supported element axially into engagement with said supporting element, cam means associated with said interlocking means for axially moving said supported element and disengaging said interlocking means rotatable in said supporting element, drive means rotatable about said axis in the supporting element, driven means rotatable about said axis in said supported element, and means establishing an axially extensible rotary driving connection between and coaxial with said driving means and said driven means.

9. A mower drive mechanism comprising a normally stationary upper housing, a shaft slidable through said housing, a mower supporting housing carried by said shaft for rotary and axial movement therewith relative to said upper housing, resilient means cooperating with said shaft to normally urge said mower supporting housing into engagement with said upper housing, clutch means on the respective housing arranged to interlock in a predetermined rotational position of said lower housing, cam means associated with said clutch means for axially moving said lower housing to disengage said clutch means and permit rotary movement of the lower housing, in combination with mower driving mechanisms in the respective housings, and an axially extensible driving connection coaxial with and operatively connecting said respective mechanisms.

10. The combination defined in claim 6 in which the axially extensible driving connection is rotatably journalled on and coaxial with the said shaft.

11. The combination defined in claim 6 in which the driving connection comprises sleeved journalled for rotation about the said shaft and respectively fixedly connected to the respective driving mechanisms.

References Cited in the file of this patent
UNITED STATES PATENTS

| | | |
|---|---|---|
| 543,083 | Dahl | July 23, 1895 |
| 553,124 | Meister | Jan. 14, 1896 |
| 930,431 | Stewart | Aug. 10, 1909 |
| 2,166,967 | Raney et al. | July 25, 1939 |
| 2,236,598 | Hautzenroeder | Apr. 1, 1941 |